UNITED STATES PATENT OFFICE.

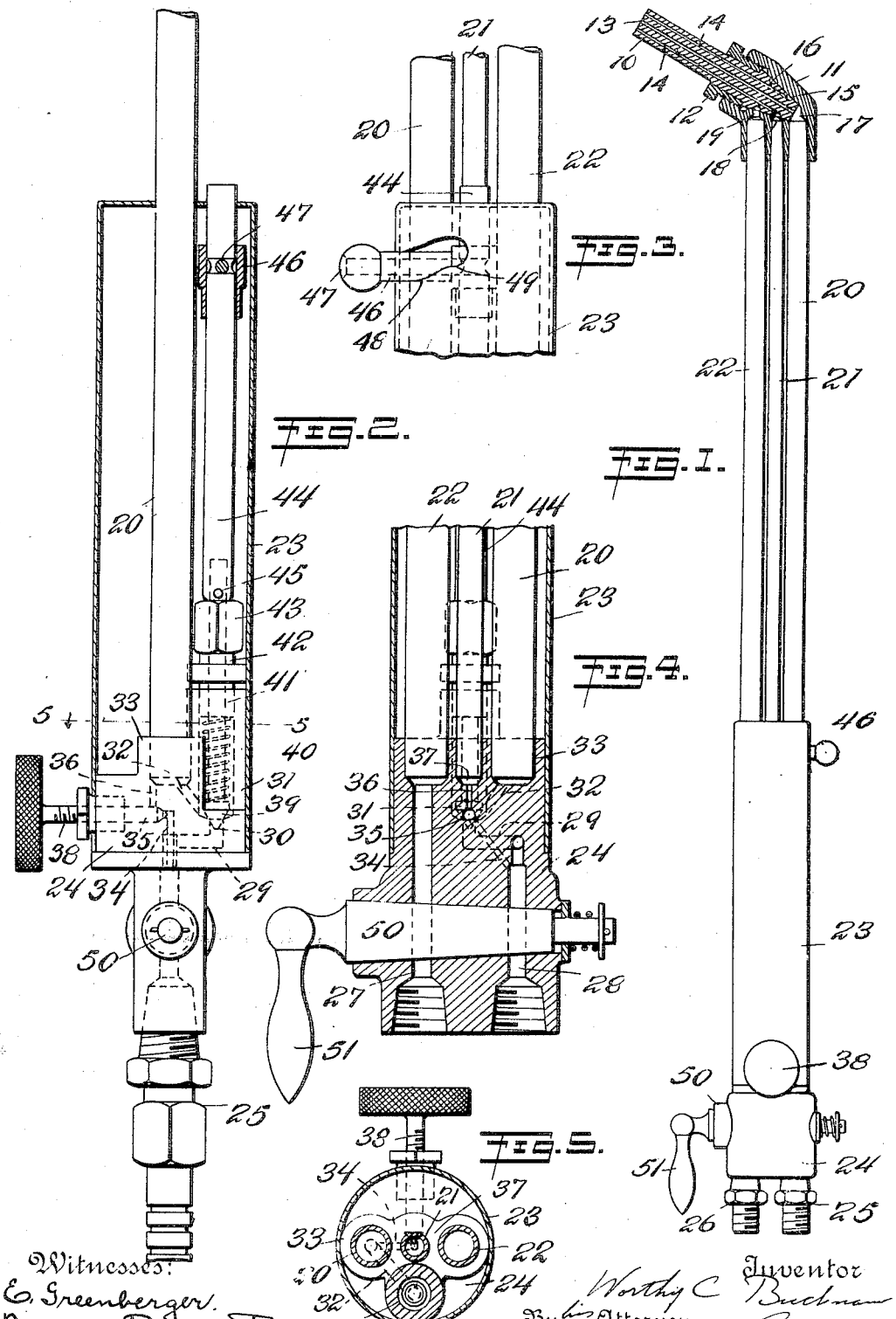

WORTHY C. BUCKNAM, OF JERSEY CITY, NEW JERSEY, ASSIGNOR TO DAVIS-BOURNONVILLE COMPANY, OF NEW YORK, N. Y., A CORPORATION OF NEW YORK.

CUTTING-TORCH.

1,044,741.   Specification of Letters Patent.   Patented Nov. 19, 1912.

Application filed May 4, 1912. Serial No. 695,289.

*To all whom it may concern:*

Be it known that I, WORTHY C. BUCKNAM, a citizen of the United States, and a resident of Marion, Jersey City, in the county of Hudson and State of New Jersey, have invented certain new and useful Improvements in Cutting-Torches, of which the following is a specification.

This invention relates to apparatus for cutting metals by means of gases, that is to say, by means of a jet or stream of oxygen playing upon the metal which is heated locally to an appropriate temperature by a burning jet or jets consisting of a combustible mixture. Such an apparatus is commonly termed a cutting torch, though it will be understood that it need not always be a hand implement. It is common to mechanically support and advance the apparatus along the line of cut, and for this purpose the device may be of any suitable or special form, or the regular or a modified form of the hand torches may be clamped and mechanically propelled. The apparatus to which this invention relates requires two gases, oxygen and a combustible gas, for example, acetylene. Oxygen composes the cutting jet or stream. It is also a constituent of the heating jet or jets, the combustible gas being the other constituent. A torch may be provided with connections for three external flexible conduits leading from suitable sources of supply, one for combustible gas, one for cutting oxygen and one for heating oxygen; or a torch may have but two connections, one for combustible gas and the other for oxygen, the cutting oxygen being divided into two parts in the torch. In any case, it should be possible to regulate the heating oxygen independently of the cutting oxygen, in order to secure a proper percentage composition for the heating mixture and in order that the proper amount of heating mixture per unit time may be delivered for any particular piece of work. Furthermore it is desirable to provide means for quickly shutting off and opening the cutting oxygen conduit so that the cutting operation may be under instant and convenient control.

An object of this invention is to provide a cutting device having improved means for closing and opening the cutting oxygen conduit, the same including a spring-seated valve housed in the handle and novel means for lifting it off its seat, and more especially to provide improved means of this character suitable for a two-hose or two-connection cutting torch.

A further object is to provide an improved construction and arrangement of passages and controlling means for a two-hose cutting torch.

A further object is to provide single means for shutting off and reëstablishing the flow of all the gases for the heating and cutting jets, in connection with individual means for controlling part or all of the conduits in the torch.

The preferred embodiments of the several features of the invention will now be briefly described, reference being had to the accompanying drawings, wherein:

Figure 1 is a side view of a torch embodying the invention, the forward portion thereof being in section; Fig. 2 is an enlarged fragmentary sectional elevation looking at right angles to the view of Fig. 1; Fig. 3 is an enlarged fragmentary side elevation looking at the reverse side to that of Fig. 1; Fig. 4 is an enlarged longitudinal section through the rear part of Fig. 1; and Fig. 5 is a horizontal section on the line 5—5 of Fig. 2, the lifting valve being omitted.

The torch here shown is of the type in which any one of a set of interchangeable tips may be applied to a head having separate gas passages therein. A suitable form of tip is illustrated and designated by the numeral 10, and 11 is a suitable head, the tip being secured to the head by a threaded bushing or coupling 12. The tip is provided with a longitudinal bore or passage 14 for conducting the heating mixture and delivering it upon the work, and another longitudinal bore or passage 13 for the cutting jet. There may be more than one heating jet passage and delivery orifice, as indicated, and at their rear ends they are provided with inlets 15 and 16, for oxygen and combustible gas, respectively. For convenience it will be assumed hereinafter that the combustible gas is acetylene. The head 11 has three separate conduits or passages 17, 18, and 19, respectively for cutting oxygen, heating oxygen and acetylene. The cutting oxygen passage 17 may communicate directly with the rear end of the cutting passage 13 in the tip; and the passages 18 and 19 in the head may communicate with the annular inlets 15 and 16, respectively, by annular grooves in the rear part of the tip. The tip is shown set an angle to the length of the torch, but this is not essential. The meeting surfaces of the tip and head afford gas-tight seals between the gases and between the gases and the atmosphere. The passages 17, 18 and 19 in the head are continuations of the parallel pipes 20, 21 and 22 on the ends of which the head 11 is carried. The pipe 20 is for cutting oxygen, 21 for heating oxygen and 22 for acetylene. The pipes may be regarded as forming the shank portion or handle extension of the torch. The rear portions of part or all of these pipes are inclosed in a tubular casing 23, affording a handle grip or the portion which may be clamped in a mechanical holding and propelling mechanism. The rear ends of the pipes are secured to a suitable block or casting 24, which is suitably secured partly in and partly outside of the rear end of the casing.

In use, the casing or handle 23 is grasped in the hand, and it is desirable to provide means whereby the cutting oxygen conduit may be opened and closed instantly and conveniently by the hand holding the torch. To this end a spring-seated valve, the preferred form of which will presently be described, is provided, together with operating means at the forward end of the handle grip for operating the same by finger or thumb movement. The valve structure is housed inside the handle, where it is not liable to injury, and more particularly inside the rear part thereof, a longitudinal connection being provided inside the handle between the valve proper and the operating means. The preferred construction with reference to these parts will now be described.

The said block 24 has two connections 25 and 26, for the attachment, respectively, of oxygen and acetylene hose. The passage 27 in the block leading from the connection 26 may communicate directly with the acetylene pipe 22. Means are provided whereby the connection 25 supplies both of the oxygen pipes or conduits 20 and 21, the two oxygen streams being individually controllable. In the particular construction shown the common oxygen passage 28 has a right angularly extending branch or bore 29, for cutting oxygen, the same communicating by a short longitudinal passage 30 with the bottom of a longitudinally disposed valve chamber 31, from the side of which an inclined bore 32 leads forward and opens into the socket 33 in which the end of the cutting oxygen pipe 20 is secured. The heating oxygen branch 34 extends forward obliquely from the passage 28 and communicates with the inner end of a transverse needle valve chamber 35, from the side of which a bore 36 extends forward to the socket 37 in which the rear end of the heating oxygen pipe 21 is secured.

The flow of heating oxygen may be regulated with exactitude and independently of the cutting oxygen by the needle valve 38. The cutting oxygen passage is opened and closed by a longitudinally-acting seat valve 39, which operates in the valve chamber 31 and is seated by a spring 40 to close communication between the bores 30 and 32. The stem 41 of the valve, which may be conical, is guided in a bushing 42, and a tight sliding fit is effected by a cap 43 screwed to the bushing. A rod 44 is secured to the valve stem 41 and constitutes an extension or continuation thereof. In order that lateral movement of the rod may not impose lateral stress on the valve stem, the connection between rod and stem may permit of a small amount of flexibility. Thus the rod 44 may have a screw socket in loose engagement with threads on the end of the valve stem, and a transverse pin 45 may hold them against unscrewing. The said rod extends forward inside the casing or handle to the forward part thereof, where it has a laterally projecting arm or thumb-piece 46 secured to it, as by a screw 47. This thumb-piece extends through a cam slot 48 in the side of the casing 23. This slot is inclined and has a rest portion 49 at its forward end. Thus by simple sidewise pressure of the thumb, the thumb-piece 46 is forced up the inclined portion of the slot, thereby pulling the rod 44 and unseating the valve 39, to the rest portion 49, which holds the valve open without necessity of maintaining the thumb pressure. By a simple reverse movement, sufficient to dislodge the thumb-piece from the rest portion, the spring 40 is enabled to shut the valve.

The acetylene and oxygen passages 27 and 28 may be controlled by a single turn cock 50 having a handle 51. In this way communication to all of the gas conduits may be closed or opened by one operation.

For hand operation the common cock 50 may or may not be used. It is particularly desirable for mechanically supported and propelled apparatus. Assuming it to be open, the acetylene passage is open through the torch and its flow may be regulated by the usual reducing valve (not shown) in the external acetylene line. The heating oxygen is now turned on and its flow exactly regulated by the needle valve 38, so that the proper heating flame is secured. Finally, the cutting oxygen is turned on at the seat valve 39. The opening of the cutting oxygen conduit does not materially affect the flow through the heating oxygen conduit, because of the greater circuity of the cutting oxygen passages in the valve block 24. At any time both the heating and cutting jets may be cut off by closing the single valve 50, and when this valve is reopened, the jets are reëstablished in proper proportions.

What is claimed as new is:

1. A torch having cutting and heating jet provisions, conduits for supplying a combustible gas and oxygen, respectively, to the heating jet, a third conduit for supplying oxygen to the cutting jet, a handle, a valve and valve chamber housed inside the handle and located in the cutting oxygen conduit to open and close the same, suitable manual means projecting outside the handle for opening the valve, and a spring for closing the same.

2. A torch having cutting and heating jet provisions, pipes for supplying a combustible gas and oxygen respectively to the heating jet, a third pipe for supplying oxygen to the cutting jet, a casing through which said pipes pass, a valve and valve chamber with valve seat housed inside said casing for shutting off and opening communication to the cutting oxygen pipe, manual means outside the casing for bodily moving said valve away from its seat to open said pipe, and a spring for closing the valve.

3. A torch having cutting and heating jet provisions, pipes for supplying a combustible gas and oxygen respectively to the heating jet, a third pipe for supplying oxygen to the cutting jet, a handle including a casing inclosing the rear parts of said pipes and constituting a hand grip, a valve and valve chamber with valve seat housed inside said handle for shutting off and opening communication through the cutting oxygen pipe, manually-operable means outside the forward part of said casing for removing said valve from its seat, and a spring for returning the valve to its seat to cut off communication through the cutting oxygen pipe.

4. A torch having cutting and heating jet provisions, pipes for supplying a combustible gas and oxygen to the heating jet, a third pipe for supplying oxygen to the cutting jet, a handle including a casing through which said pipes pass, a spring-seated valve controlling the cutting oxygen pipe housed inside the rear part of the handle, an operating device outside the forward part of the handle in convenient position to be engaged by the hand grasping the handle, and connections inside the casing between said operating device and said valve.

5. A torch having cutting and heating jet provisions, conduits for supplying a combustible gas and oxygen for the heating jet, a third conduit for supplying oxygen to the cutting jet, a handle, a spring-seated valve for closing and opening said cutting oxygen conduit, being housed inside and acting longitudinally of said handle, and an operating device connected with the stem of said valve and projecting laterally from said handle.

6. A torch having cutting and heating jet provisions, pipes for supplying a combustible gas and oxygen for the heating jet, a pipe for supplying oxygen to the cutting jet, a handle including a casing through which the pipes pass, a valve chamber and valve seat inside the handle at one side of and communicating with the rear end of the cutting jet pipe, a valve in said chamber acting longitudinally of the handle and spring-pressed rearward against its seat, a pull rod connected to said valve and extending longitudinally inside said casing, an operating arm secured to the forward end of said rod and projecting laterally therefrom outside the casing, and a rest with which said arm may be engaged by turning it and pushing it forward to hold the valve open.

7. A torch having cutting and heating jet provisions, conduits for supplying a combustible gas and oxygen for the heating jet and a conduit for supplying oxygen to the cutting jet, a handle, a valve and valve seat for closing and opening the cutting oxygen conduit, a spring pressing the valve against the seat in a direction rearward of the handle, a rod connected to the valve extending longitudinally forward in the handle, an operating arm secured to said rod, and a cam-way engaged by said arm and having a rest portion for holding the valve open.

8. A torch having cutting and heating jet provisions, pipes for supplying a combustible gas and oxygen for the heating jet, a pipe for supplying oxygen to the cutting jet, a handle including a casing through which the pipes pass, a valve chamber with valve seat inside the handle at one side of and communicating with the rear end of the cutting jet pipe, a valve in said chamber acting longitudinally of the handle and spring pressed rearward against its seat, a pull rod connected to said valve and extending longitudinally inside said casing, and an operating arm secured to the forward end of said rod, said casing having an inclined slot with a rest portion at its forward end through which said arm projects.

9. A torch having cutting and heating jet provisions, conduits for supplying a combustible gas and oxygen to the heating jet, a conduit for supplying oxygen to the cutting jet, a valve and valve chamber with valve seat in the cutting oxygen conduit, a spring for closing said valve on its seat, a rod connected with the valve and extending longitudinally of the torch, an operating piece connected with the rod, and a catch to hold said operating piece and rod in position with the valve open.

10. A torch having means for delivering cutting and heating jets, a conduit for supplying oxygen to the cutting jet, a valve for opening and closing communication through said conduit, a spring tending to close the valve, suitable means for opening the same, and a quick-release catch for holding the valve open.

11. A torch having cutting and heating jet provisions, three pipes for supplying the same, a connection block at the rear end of said pipes with a single oxygen connection, said block having two passages communicating with said connection and leading to two of said pipes, an opening and closing valve controlling the passage leading to the cutting jet pipe, and a needle valve independent of said opening and closing valve controlling the passage leading to the oxygen pipe for supplying the heating jet.

12. A torch having cutting and heating jet provisions, three pipes for supplying the same, a connection block at the rear end of said pipes having a single oxygen connection at the back and two sockets at the front for the reception of the oxygen pipes supplying the cutting and heating jets respectively, a valve chamber at the front of said block, an opening and closing valve therein, a passage extended laterally from said oxygen connection and entering said valve chamber and a passage extending laterally from said valve chamber to the socket of the cutting jet pipe, said block being further provided with a lateral needle valve chamber, a needle valve therein, a passage leading from said oxygen connection to said needle valve chamber, and a passage from said needle valve chamber to the socket of the heating jet oxygen pipe, the passages for heating jet oxygen being more direct than the passages for the cutting jet oxygen.

13. A torch having cutting and heating jet provisions, three pipes for supplying the same, a connection block at the rear end of said pipes having a single oxygen connection at the back and two sockets at the front for the reception of the oxygen pipes supplying the cutting and heating jets respectively, a valve chamber at the front of said block, an opening and closing valve therein, a passage extended from said oxygen connection and entering said valve chamber and a passage extending from said valve chamber to the socket of the cutting jet pipe, said block being further provided with a needle valve chamber, a needle valve therein, a passage leading from said oxygen connection to said needle valve chamber, and a passage from said needle valve chamber to the socket of the heating jet oxygen pipe.

14. A torch having cutting and heating jet provisions, three conduits for supplying the same, two connections, one for oxygen and one for combustible gas, the oxygen connection communicating with two of said conduits and the combustible gas connection communicating with the third conduit, valves independently controlling the two oxygen conduits, one of said valves controlling one oxygen conduit and the other valve controlling the other oxygen conduit, and a single valve for shutting off and opening the communication through both connections.

15. Apparatus for cutting metals by means of gases having means for mixing oxygen and a combustible gas and delivering them as a heating jet as well as means for delivering a jet of cutting oxygen, and a single valve controlling the flow of all the gases to both jets.

In witness whereof I have signed my name in the presence of two subscribing witnesses.

WORTHY C. BUCKNAM.

Witnesses:
J. F. BRANDENBURG,
E. GREENBERGER.

Copies of this patent may be obtained for five cents each, by addressing the "Commissioner of Patents, Washington, D. C."